United States Patent
Schade

(10) Patent No.: US 10,120,131 B2
(45) Date of Patent: Nov. 6, 2018

(54) PLANAR-OPTICAL ELEMENT, SENSOR ELEMENT HAVING NANOWIRES AND METHOD FOR THE PRODUCTION THEREOF

(71) Applicant: Fraunhofer-Gelsellschaft zur Förderung der angewandten Forschung e.V., Munich (DE)

(72) Inventor: Wolfgang Schade, Goslar (DE)

(73) Assignee: FRAUNHOFER-GESELLSCHAFT ZUR FÖRDERUNG DER ANGEWANDTEN FORSCHUNG E.V, Munich (DE)

(*) Notice: Subject to any disclaimer, the term of this patent is extended or adjusted under 35 U.S.C. 154(b) by 0 days.

(21) Appl. No.: 14/420,083

(22) PCT Filed: Aug. 2, 2013

(86) PCT No.: PCT/EP2013/066313
§ 371 (c)(1),
(2) Date: Feb. 6, 2015

(87) PCT Pub. No.: WO2014/026867
PCT Pub. Date: Feb. 20, 2014

(65) Prior Publication Data
US 2015/0219848 A1    Aug. 6, 2015

(30) Foreign Application Priority Data
Aug. 14, 2012  (DE) .................... 10 2012 214 440

(51) Int. Cl.
*G02B 6/12* (2006.01)
*G02B 6/122* (2006.01)
(Continued)

(52) U.S. Cl.
CPC ........ *G02B 6/1225* (2013.01); *G01K 11/3206* (2013.01); *G01L 1/246* (2013.01);
(Continued)

(58) Field of Classification Search
CPC ...... G02B 6/1225; G02B 6/107; G02B 6/124; G02B 6/132; G02B 2006/12138;
(Continued)

(56) References Cited

U.S. PATENT DOCUMENTS 5,480,687 A   1/1996  Heming et al.
5,716,679 A   2/1998  Krug et al.
(Continued)

FOREIGN PATENT DOCUMENTS

DE    41 305 50 A1    3/1993
DE    603 16 759 T2   7/2008
(Continued)

OTHER PUBLICATIONS

Hill et al., "Fiber Bragg Grating Technology Fundamentals and Overview," dated Aug. 1997, pp. 1263-1276, Journal of Lightwave Technology, vol. 15, No. 8, Institute of Electrical and Electronics Engineers.
(Continued)

*Primary Examiner* — Akm Enayet Ullah
(74) *Attorney, Agent, or Firm* — Brinks Gilson & Lione

(57) ABSTRACT

The invention relates to a planar-optical element having at least one photonic component, which is arranged in at least one substrate containing or consisting of at least one polymer, wherein the substrate includes at least one first film layer having a first side and an opposite second side and a second film layer having a first side and an opposite second side, wherein the first side of the second film layer is arranged on the second side of the first film layer and at least the second film layer contains nanowires, at least in a
(Continued)

subarea. The invention also relates to a corresponding sensor element and a method for the production thereof.

19 Claims, 3 Drawing Sheets

(51) Int. Cl.
| | |
|---|---|
| G02B 6/132 | (2006.01) |
| G01K 11/32 | (2006.01) |
| G01L 1/24 | (2006.01) |
| G02B 6/10 | (2006.01) |
| G02B 6/124 | (2006.01) |
| G02B 6/293 | (2006.01) |

(52) U.S. Cl.
CPC .............. *G02B 6/107* (2013.01); *G02B 6/124* (2013.01); *G02B 6/12009* (2013.01); *G02B 6/1221* (2013.01); *G02B 6/132* (2013.01); *G02B 6/12007* (2013.01); *G02B 6/29395* (2013.01); *G02B 2006/12138* (2013.01)

(58) Field of Classification Search
CPC ............ G02B 6/12009; G02B 6/29395; G02B 6/12007; G02B 6/1221; G01K 11/3206; G01L 1/246
USPC ...... 385/14, 24, 147; 156/272.2, 272.8, 180, 156/802
See application file for complete search history.

(56) References Cited

U.S. PATENT DOCUMENTS

| | | | | |
|---|---|---|---|---|
| 6,574,383 | B1* | 6/2003 | Erchak | G02B 6/1225 385/122 |
| 6,800,373 | B2 | 10/2004 | Gorczyca | |
| 7,233,041 | B2* | 6/2007 | Duan | B82Y 10/00 257/14 |
| 7,865,048 | B2* | 1/2011 | McCaughan | G02F 1/3534 385/122 |
| 8,497,051 | B2 | 7/2013 | de Oliveira et al. | |
| 2003/0031438 | A1* | 2/2003 | Kambe | B82Y 20/00 385/122 |
| 2005/0009224 | A1* | 1/2005 | Yang | H01L 21/0237 438/57 |
| 2009/0034215 | A1* | 2/2009 | Wieglus | H01L 21/4846 361/760 |
| 2009/0242246 | A1* | 10/2009 | Liou | H05K 1/097 174/256 |
| 2011/0143159 | A1 | 6/2011 | Palumbo et al. | |
| 2011/0253982 | A1* | 10/2011 | Wang | B82Y 10/00 257/24 |
| 2011/0256197 | A1 | 10/2011 | Southward et al. | |
| 2012/0321242 | A1 | 12/2012 | Schade et al. | |
| 2013/0298979 | A1* | 11/2013 | Schade | H01L 31/02363 136/255 |
| 2014/0061452 | A1* | 3/2014 | Schade | G01D 5/35387 250/227.14 |
| 2014/0118741 | A1* | 5/2014 | Heidrich | G01N 21/7746 356/402 |
| 2015/0309251 | A1* | 10/2015 | Schade | G02B 6/02147 264/1.27 |
| 2016/0047946 | A1* | 2/2016 | Arita | G02B 1/04 428/1.1 |

FOREIGN PATENT DOCUMENTS

| | | |
|---|---|---|
| DE | 10 2008 064 168 A1 | 6/2010 |
| DE | 10 2011 017 622 B3 | 10/2012 |
| EP | 0 533 074 A1 | 3/1993 |
| EP | 0 378 226 B1 | 4/1996 |
| EP | 1 351 075 A1 | 10/2003 |
| EP | 1 886 802 A2 | 2/2008 |
| JP | H1-11-109155 A | 4/1999 |
| JP | 2006-208982 A | 8/2006 |
| JP | 2009-086138 | 4/2009 |
| JP | 2010-018717 A | 1/2010 |
| JP | 2010-129964 A | 6/2010 |
| JP | 2010-281878 A | 12/2010 |
| WO | WO 2006/014582 A2 | 2/2006 |
| WO | WO 2011/089244 A2 | 7/2011 |

OTHER PUBLICATIONS

Hu et al., "Efficient dispersion of multi-walled carbon nanotubes by in situ polymerization," dated Dec. 29, 2006, pp. 655-659, Polymer International, vol. 56.

Keil et al., "Athermal all-polymer arrayed-waveguide grating multiplexer," dated Apr. 26, 2001, pp. 579-580, Electronic Letters, vol. 37, No. 9, Institute of Electrical and Electronics Engineers.

Kokubun et al., "Three-dimensional athermal waveguides for temperature independent lightwave devices," dated Jul. 21, 1994, pp. 1223-1224, Electronic Letters, vol. 30, No. 15, Institute of Electrical and Electronics Engineers.

Ma et al., "Polymer-Based Optical Waveguides: Materials, Processing, and Devices," dated Oct. 2, 2002, pp. 1339-1365, Advanced Materials, vol. 14, No. 19, Wiley-VCH Verlag GmbH & Co. KGaA, Weinheim.

Sandu et al. "Synthesis of optical transparent and electrical conductive polymer/nanocarbon composite films by infiltration method," dated Feb. 2, 2011, pp. 4128-4131, Thin Solid Films, vol. 519, Elsevier B.V.

Yoshida et al., "TiO$_2$ nano-particle-dispersed polyimide composite optical waveguide materials through reverse micelles," dated 1997, pp. 4047-4051, Journal of Materials Science, vol. 32, Chapman & Hall.

International Search Report, dated Feb. 7, 2014, pp. 1-3, International Application No. PCT/EP2013/066313, European Patent Office, Rijswijk, The Netherlands.

* cited by examiner

PLANAR-OPTICAL ELEMENT, SENSOR ELEMENT HAVING NANOWIRES AND METHOD FOR THE PRODUCTION THEREOF

This application is a national stage entry of international patent application PCT/EP2013/066313 entitled "PLANAROPTISCHES ELEMENT, SENSORELEMENT UND VERFAHREN ZU DESSEN HERSTELLUNG," filed Aug. 2, 2013, the entire contents of which are incorporated by reference, which in turn claims priority to German patent application 102012214440.4 entitled "PLANAROPTISCHES ELEMENT, SENSORELEMENT UND VERFAHREN ZU DEREN HERSTELLUNG," filed Aug. 14, 2012, the entire contents of which are incorporated by reference.

BACKGROUND

The invention relates to a planar-optical element comprising at least one photonic component which is arranged in at least one substrate containing or consisting of at least one polymer. Furthermore, the invention relates to a sensor element containing at least one waveguide having at least one core made of a first material having a first refractive index and a cladding which surrounds the cores and is made of a second material having a second refractive index, wherein at least one fiber Bragg grating is inserted in the core. Finally, the invention relates to a method for producing such a planar-optical element or a sensor element.

It is known from WO 2011/089244 A2 to use a fiber-optic sensor having a plurality of fiber Bragg gratings for detecting temperatures and/or mechanical stresses. The light reflected by the fiber Bragg gratings is identified by means of a spectrometer, wherein this spectrometer can be arranged as a planar-optical filter element on a silicon substrate. However, the major expenditure involved in the production of the planar-optical filter element on a silicon substrate is a drawback.

BRIEF DESCRIPTION OF DRAWINGS

The invention shall be explained in more detail below by means of drawings without limiting the general inventive concept, wherein.

DETAILED DESCRIPTION

Figure 1:
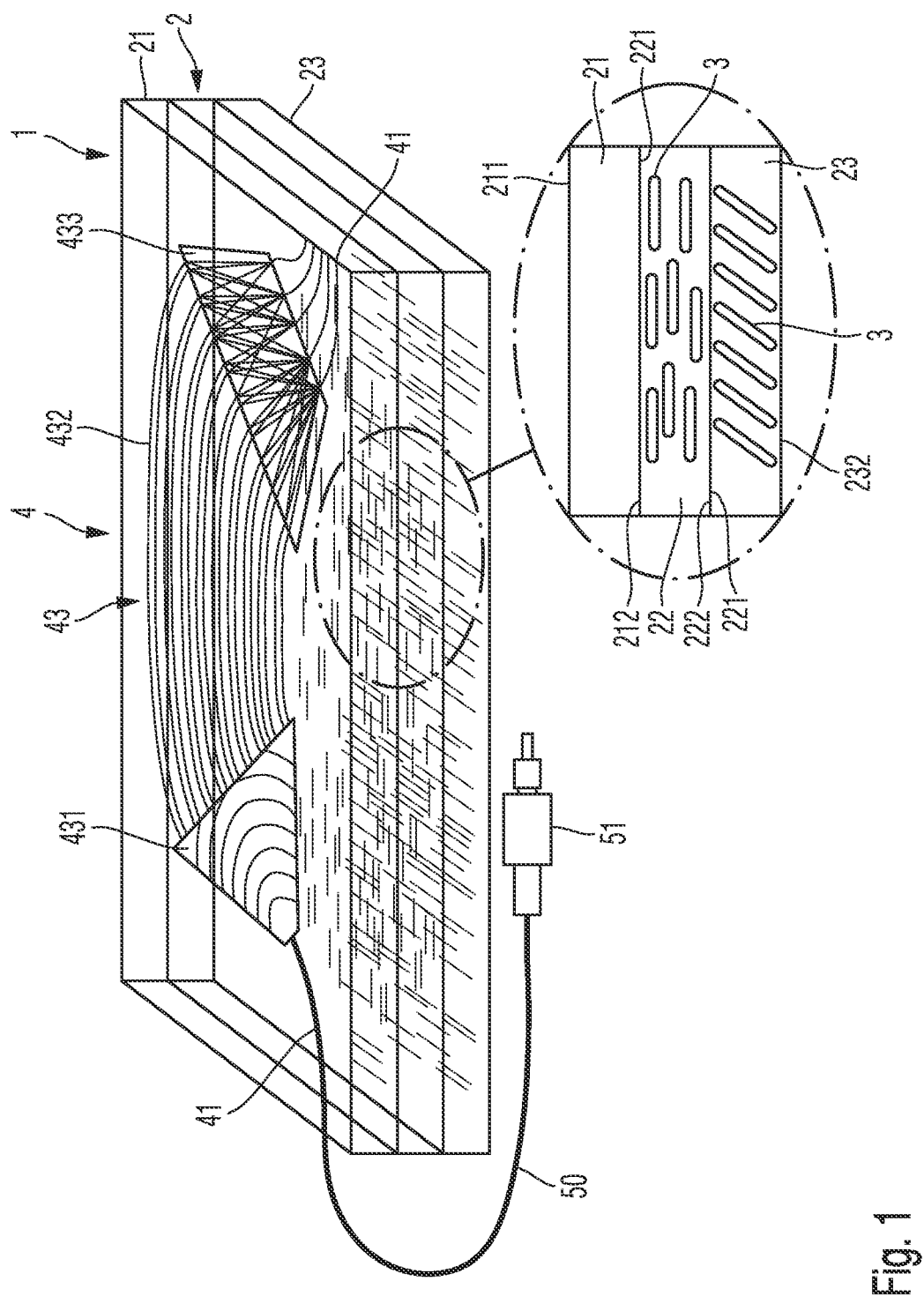
FIG. 1 shows a planar-optical element according to an embodiment of the invention.

On the basis of this prior art, the object of the invention is therefore to provide a sensor element and/or a planar-optical filter element which can be produced in large quantities in a cost-effective and simple manner and can easily be integrated into further components and/or parts.

It is proposed according to the invention to integrate at least one photonic component on a support or a substrate. The photonic component can be a passive optical component, for example. In some embodiments of the invention, the passive optical component can be selected from a waveguide, a fiber Bragg grating, a coupler or an arrayed waveguide grating. The planar-optical element and/or the proposed sensor element contains at least one such photonic component. In some embodiments of the invention, it is also possible to integrate a plurality of photonic components on the substrate so as to yield an integrated photonic component which can carry out a plurality of functions or at least one complex function. In some embodiments of the invention, the photonic component can be a spectrometer for a plurality of channels, and therefore the intensity of incident light can be determined in a presettable spectral range. Such spectrometers can be used e.g. for the selection of fiber-optic sensor systems or for the signal selection or for the signal generation in optical communication engineering.

It is now proposed according to the invention to use a multilayered polymer material as a substrate. The polymer material can contain or consist of polymethyl methacrylate, polycarbonate and/or polyimide. The substrate includes a first layer having a first side and an opposite second side and at least a second layer having a first side and an opposite second side. Both layers are connected to each other in a firmly adhering manner, e.g. by bonding, welding or laminating so as to place the first side of the second layer on the second side of the first layer. The photonic components are arranged in the first layer and can be produced by a printing method, by photolithographic patterning or by modification of materials using laser radiation, for example. In the latter case, a modification of materials can advantageously be used by femto second laser pulses. In order to minimize the losses resulting from light scatter or refraction in the first layer, the first layer has no inclusions or inhomogeneous material, at least in the subareas in which the photonic components are arranged. However, this results in a relatively large thermal expansion coefficient, and therefore change in the temperature modifies the size of the photonic components. This can change the optical properties of the at least one photonic component.

It is now proposed according to the invention to reinforce the second layer of the substrate with nanowires to compensate for the temperature-related expansion. The nanowires can be introduced into the second layer by co-extrusion, by lamination, by a sol-gel method or other methods which are not specified herein. The nanowires can absorb and counteract tensile stresses in the material, and therefore the temperature expansion of the second layer can be much less than the temperature expansion of the first layer as such. In some embodiments of the invention, the second layer can have a negative temperature coefficient in some temperature ranges, i.e. instead of thermally expanding, the second layer contracts with increasing temperature.

Due to the bond between the first layer and the second layer, the second layer can compensate or at least reduce the temperature expansion of the first layer, and therefore the photonic components on the substrate function properly even in the case of temperature changes, at least in a presettable temperature range.

Although the present description only describes three layers as constituents of the substrate, it should be noted that in some embodiments of the invention, the number of available layers can also be larger. For example, a plurality of first layers can be provided so as to arrange a larger number of photonic components on top of one another in the substrate. In other embodiments of the invention, a layer can be composed of a plurality of layers so as to form a multi-layer system. As a result, the material properties of the layer can be adapted in an even better way to presettable nominal values.

In some embodiments of the invention, the second film layer can be provided with nanowires over the entire surface, and therefore the substrate has the required small temperature coefficient over the entire surface.

In other embodiments of the invention, only a subarea of the second film layer can be provided with nanowires so as to yield surface areas where the photonic components are protected from an inadmissibly large thermal expansion and other surface areas of the substrate have a different, usually greater, temperature coefficient.

In some embodiments of the invention, the nanowires can contain or consist of zinc oxide and/or titanium dioxide and/or carbon nanotubes. These materials are suitable to ensure the desired small temperature expansion of the substrate, on the one hand, and can easily be introduced into the conventional polymer materials for the production of the substrate, on the other hand.

In some embodiments of the invention, the nanowires can be produced by a wet chemical process. This permits a cost-effective large-scale production of the nanowires.

In other embodiments of the invention, the nanowires can be produced from plasma. As a result of the non-equilibrium conditions appearing, it is thus possible to also process nanowires from materials which are not thermodynamically stable.

In some embodiments of the invention, the nanowires can have a diameter of about 100 nm to about 1000 nm. In some embodiments of the invention, the nanowires can have a length of about 1 μm to about 10 μm. These dimensions have proved their worth to the effect that a sufficient reduction of the thermal expansion of the substrate can be achieved and, at the same time, the nanowires can be easily produced and easily processed.

In some embodiments of the invention, the first film layer can contain nanoparticles and/or dopants. Such nanoparticles can be used additionally or alternatively to dopants to achieve presettable optical properties of the first film layer. In some embodiments of the invention, nanoparticles and/or dopants can be used to adapt the refractive index of the first film layer to presettable values.

In some embodiments of the invention, only a subarea of the first film layer and/or a partial volume of the film layer can be provided with nanoparticles. This allows the adaptation of the optical properties of the material in certain spatial areas and/or for certain photonic components. However, other photonic components can be arranged in other surface areas which, in turn, have different optical properties.

In some embodiments of the invention, the first film layer can include nanoparticles which contain or consist of titanium dioxide and/or zinc oxide and/or silicon dioxide. It was possible to show that these materials can easily be produced, disperse well in the polymer materials of the first film layer and also have a favorable influence on the optical properties for the presettable wavelengths and/or wavelength ranges.

In some embodiments of the invention, the first film layer can contain nanoparticles which have a diameter of about 10 nm to about 500 nm or which have a diameter of about 100 nm to about 800 nm.

In some embodiments of the invention, the planar-optical element can contain a third film layer having a first side and an opposite second side, wherein the third film layer contains nanowires, at least in a subarea. The first side of the third film layer can be connected to the second side of the second film layer over the entire area, e.g. by adhering, welding or laminating. In some embodiments of the invention, this leads to a further improved stability and thus to a reduced influenceability of the photonic components by thermal expansion and/or the impact of mechanical stresses on the substrate.

In some embodiments of the invention, the nanowires have a presettable orientation. Such an orientation can be achieved e.g. by applying an electric and/or magnetic field, as a result of which the nanowires orient themselves along a desired direction before the polymer material solidifies. In some embodiments of the invention, the orientation of the nanowires can differ from the desired orientation by less than 20°, less than 15°, less than 5° or less than 3°. As a result, a substrate can be provided which shows anisotropic thermal expansion characteristics.

In some embodiments of the invention, the orientation of the nanowires of the third film layer can differ from the orientation of the nanowires of the second film layer. In some embodiments of the invention, the nanowires of the third film layer and of the second film layer can be arranged in approximately orthogonal fashion. This renders possible a particularly stable substrate which interlocks different expansion characteristics of the layers in the manner of laminated wood or plywood.

In some embodiments, the planar-optical element can contain a fiber-optic sensor which has at least one waveguide which, in turn, includes at least one core made of a first material having a first refractive index and a cladding which surrounds the core and is made of a second material having a second refractive index. In this way, an optical wave can be totally reflected at the interface between the first material and the second material, and therefore the optical power is guided in the core. At least one fiber Bragg grating can be inserted in the core. The fiber Bragg grating reflects part of the coupled optical power and transmits the other part. The wavelength and/or the wavelength distribution of the reflected light depends on the grating constant of the fiber Bragg grating. The grating constant, in turn, is defined by the grating constant originally intended in the production of the fiber Bragg grating and the change thereof by thermal expansion and/or mechanical stress. Thus, it is possible to select one of a plurality of fiber Bragg gratings by analysis of the spectral distribution of the reflected light and to determine the temperature and/or force prevailing at the site of this fiber Bragg grating.

By the introduction of such a sensor element on the substrate, it is possible to provide a part which integrates both the sensor element and the spectrometer required for selection. One or more sensors can cover a relatively large area so as to enable the areal detection of force or temperature. For the purpose of use, the substrate must merely be adhered onto the part to be monitored or be laminated into the part to be monitored.

In some embodiments of the invention, the part provided with the sensor can be a battery or a battery housing. In other embodiments of the invention, the part to be monitored can be a mechanical component, e.g. the blade of a wind turbine, a wing, an engine nacelle or a fuselage of an aircraft, a tire or another part which is not mentioned herein from a fiber-reinforced plastic material, a thermoplastic resin, a thermosetting resin or a rubber. The proposed sensor element can be embedded in these material systems in a particularly easy way during primary shaping.

FIG. 1 shows a planar optical-element 1 according to an embodiment of the invention. In the illustrated exemplary embodiment, the planar-optical element has a substrate 2 which is composed of a first layer 21, a second layer 22 and a third layer 23. The first layer 21, the second layer 22 and the third layer 23 all contain a polymer as a basic material. In the first layer 21, at least a subarea and/or a partial volume can be provided with nanoparticles which contain $TiO_2$, for example. The optical properties of the first layer 21 can thus be influenced.

The second layer 22 and the third layer 23 contain nanowires 3 in addition to the basic material. The nanowires 3 are introduced into each layer with a preferred direction, i.e. the longitudinal extensions of the individual nanowires 3 extend approximately parallel to one another and approximately parallel to a presettable desired direction.

As shown by a cross-section through the substrate 2, the first side 211 of the first layer 21 forms the surface of the substrate 2. The second side 212 of the first layer 21 is placed on the first side 221 of the second layer 22. The interface can be connected over the entire area by welding, adhering or laminating. Likewise, the second side 222 of the second layer 22 is placed on the first side 232 of the third layer 23. A firmly adhering connection over the entire area can be provided along this interface as well. The second side 223 of the third layer 23 forms the bottom side of the substrate 2. As is also outlined in the cross-section, the longitudinal extensions of the nanowires 3 extend in the second layer 22 approximately orthogonal to the longitudinal extension of the nano tubes 3 of the third layer 23. In this way, mechanical stabilization and/or stabilization against thermal expansions is obtained in both spatial directions, and therefore there is little impact on the photonic component 4 on the substrate 2 by thermal expansion or the application of a force.

The nanowires 3 can be arranged in the substrate 2 over the entire area, and therefore the entire substrate 2 is insensitive to thermal expansion, i.e. there are only minor changes in length and/or width depending on the temperature. The first layer 21, the second layer 22 and the third layer 23 can all have a thickness of about 25 μm to about 250 μm or about 50 μm to about 125 μm. At least one of the layers 21, 22 or 23 can be produced by extrusion, rolling or wet chemical deposition.

An arrayed waveguide grating 43 is shown as an example of a photonic component 4. The arrayed waveguide grating can be used as an optical microspectrometer, i.e. input signals of different wavelengths are shown at different sites of the output.

The optical input signal is supplied to the planar-optical element 1 by means of an optical waveguide 50, which can be provided with an optional plug-in connector 51. The input signal is transmitted via the waveguide 50 into the integrated waveguide 41. The waveguide 41 guides the input signal to the free propagation area 431 of the arrayed waveguide grating 43. The free propagation area 431 has an approximately triangular base area.

A plurality of waveguides 432 is attached to the end of the free propagation area 431. The waveguides 432 have different lengths and guide the optical input signal from the propagation rea 431 to the interference area 433 where the different wavelengths are brought to interference. An interference pattern is formed at the output of the interference area 431, with different wavelengths being shown at different sites.

Further waveguides which transport the output signal to the output of the planar-optical element are disposed at each of the interference maximums.

The individual components of the arrayed waveguide gratings 43 can be introduced into the first layer 21 by a nanoprinting method, for example. In other embodiments of the invention, the components can be produced by a modification of the materials using a laser or by conventional photolithography in the first layer 21.

A conventional polymer substrate would expand or contract when the temperature changes so as to modify the geometric dimensions of the arrayed waveguide grating 43. This would deteriorate the efficiency of the arrayed waveguide grating 43. A sufficient mechanical stabilization of the substrate 2 can be achieved by the inventive reinforcement of the substrate by nanowires 3, which are arranged in the second layer 22 and the optional third layer 23, and therefore the arrayed waveguide grating 43 always shows full efficiency or an efficiency improved with respect to known polymer substrates even in the case of fluctuating temperatures. At the same time, the substrate 2 made of a polymer material has the advantage over known silicon substrates that even very large substrates can be produced in a cost-effective manner, and therefore large photonic components or many photonic components can be produced in a cost-effective manner. An arrayed waveguide grating having relatively large dimensions can have improved channel distances which are more than 400 GHz, more than 600 GHz or more than 1 THz, for example.

In the same way as shown in FIG. 1 for an arrayed waveguide grating 43, additional or other photonic components can be arranged on the substrate 2. For example, couplers, fiber Bragg gratings, fiber-optic sensors or waveguides and elements derived therefrom can be produced in the first layer 21.

Figure 2:
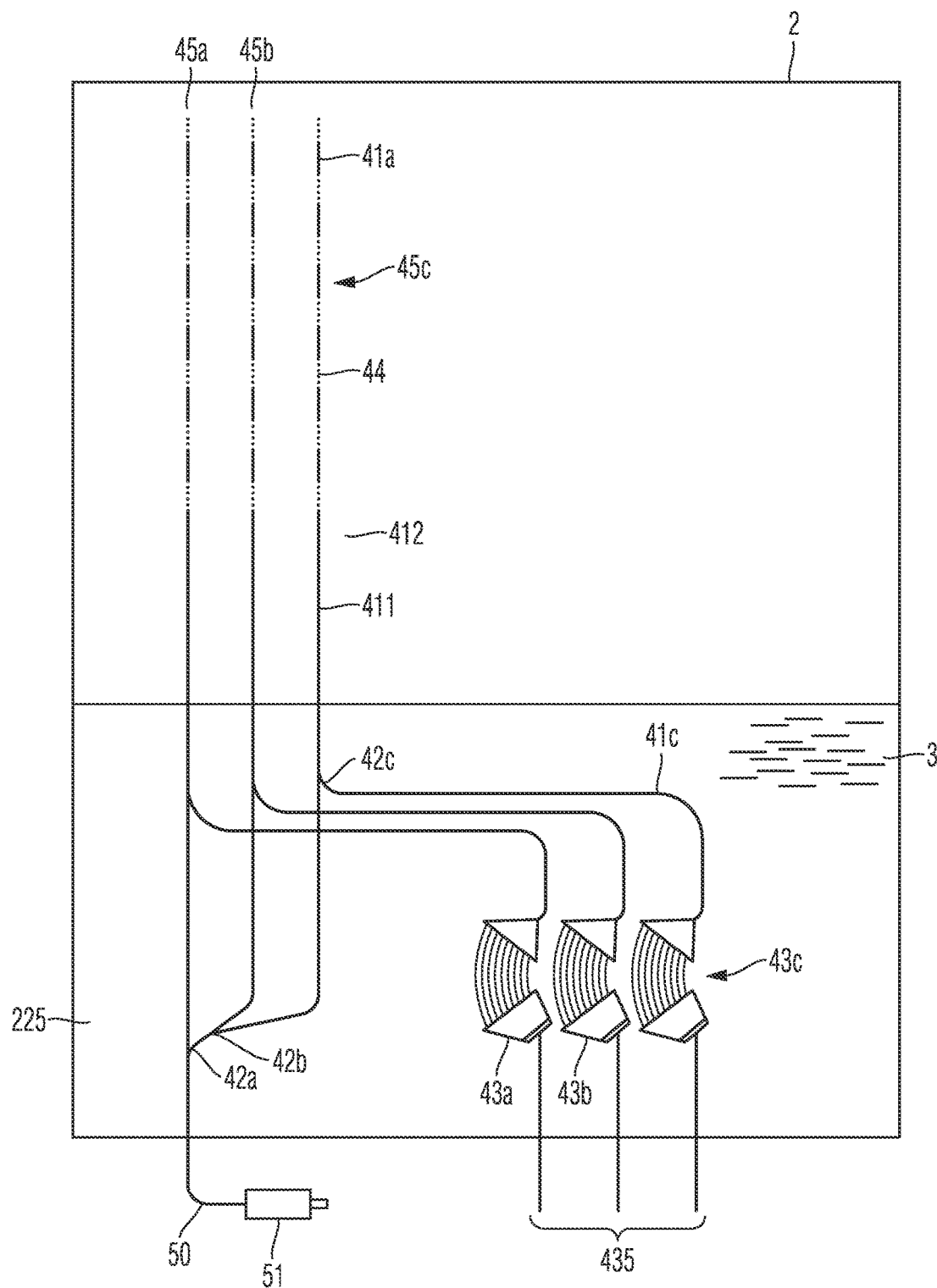
FIG. 2 shows a sensor element according to an embodiment of the invention.

FIG. 2 shows an exemplary embodiment of a sensor element which is arranged on a substrate 2. The substrate 2 can be composed of at least two layers, as already explained above by means of FIG. 1. In the exemplary embodiment according to FIG. 2, the substrate 2 has a subarea 225 which is reinforced by nanowires 3. For reasons of overview, only some few nanowires 3 and their orientation are shown. However, the nanowires 3 can, of course, occupy the entire subarea 225 and can be arranged in several different orientations in one or more layers. What is essential is merely that a sufficiently small expansion is achieved by the nanowires 3 for at least one temperature range, and therefore the components arranged in the surface area 225 are not inadmissible affected by the application of forces and/or temperature fluctuations.

The remaining surface area of the substrate 2 is provided with fiber-optic sensors 45a, 45b and 45c. The invention does not teach the use of precisely three fiber-optic sensors 45. The respectively selected number can rather be larger or smaller and be 1 to about 50, for example.

Each of the fiber-optic sensors 45 has a core 411 the refractive index of which is greater than the refractive index of the first layer 21 of the substrate 2. As a result, light is guided inside the core 411 so as to obtain a waveguide 41. In the illustrated exemplary embodiment, the waveguides are arranged in a straight line. Of course, it is also possible to realize meandering or spiral arrangements of at least one waveguide 41.

At least one fiber Bragg grating 44 is arranged in the core 411 of the waveguide 41. In the illustrated exemplary embodiment, each core 41 has seven fiber Bragg gratings 44. In other embodiments of the invention, the number can be greater or smaller. In addition, different numbers of fiber Bragg gratings 44 can be arranged in different waveguides 41.

The optical waveguide 41 and/or the fiber Bragg gratings 44 can be produced by laser material processing and/or nanoprinting in substrate 2.

Since the substrate 2 contains no stabilizing nanowires in the area of the fiber-optic sensors 45, the grating constant of the fiber Bragg grating 44 changes upon the application of force and/or temperature. As a result, the spectrum reflected by the respective gratings 40 changes.

The light respectively reflected by the fiber Bragg gratings 44 is analyzed by the spectrometer arranged in the surface area 225. A terminal waveguide 50 having an optional plug-in connector 51 serves for producing the optical signal 45. The light of a superluminescence diode or a tunable semiconductor laser can be fed via said plug-in connector. The light is split into three optical paths by means of two couplers 42a and 42b, each of said paths being connected to a fiber-optic sensor 45.

The light reflected by the fiber Bragg gratings 44 is guided to three arrayed waveguide gratings 43a, 43b and 43c via further couplers 42c, 42d and 42e. They provide an optical signal at the output waveguides 435. Said signal can be converted into electrical signals, e.g. via a CCD line or a photodiode array. The size of the optical signal is thus a criterion for the intensity of the light reflected by the respective fiber Bragg grating 44 and thus a criterion for the temperature and/or force prevailing at the site of the respective grating 44. If the same temperature is applied to the area 225, the spectrometer still remains substantially unaffected since the nanowires 3 mechanically stabilize this subarea of the substrate 2.

Therefore, the invention discloses for the first time the integration of a fiber-optic sensor and the associated signal selection on a substrate 2.

Figure 3:
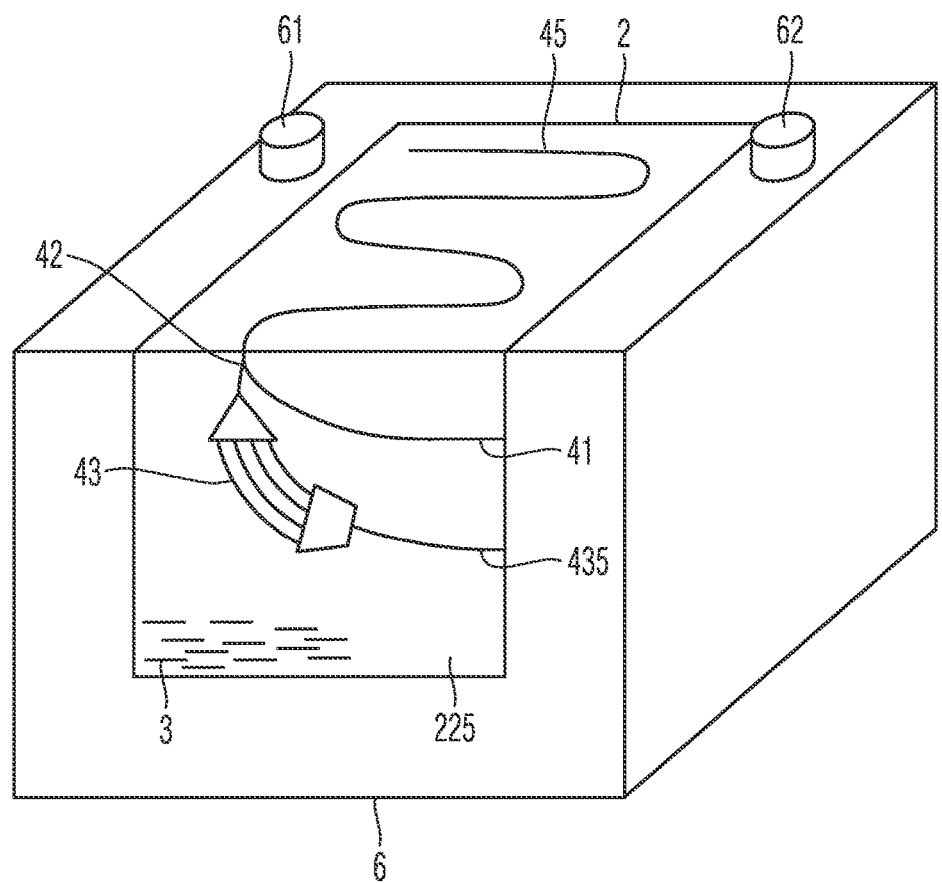
FIG. 3 shows a battery housing having a sensor element.

FIG. 3 shows a possible use of the sensor element of FIG. 2 and/or the planar-optical element according to FIG. 1. FIG. 3 shows a battery housing 6 which can contain a plurality of battery cells to provide a battery having a presettable electric voltage and/or a presettable current supply ability. The outer side of the battery housing 6 has at least two terminal contacts 61 and 62 via which current can be withdrawn from or a charging current can be supplied to the battery.

In order to monitor the temperature of the battery cells in the housing 6, it is possible to provide a fiber-optic sensor 45 which contains in each case a plurality of fiber Bragg gratings 44, as described above by means of FIG. 2. The battery housing 6 can be designed correspondingly in this respect, and therefore the temperature of the battery cells can be determined at the respective site of the fiber Bragg grating 44. The fiber-optic sensor 45 is formed on a carrier 2 which is adhered to the battery housing 6 or is embedded in the material for the battery housing 6.

As described above, the substrate 2 has a surface area 225 which is stabilized by nanowires 3. This area includes a planar-optical spectrometer in the form of an arrayed waveguide grating 43. The light for inquiry of the respective grating constants of the arrayed waveguide gratings 44 can be fed via the waveguide 41 and the coupler 42, as described above. Thus, the proposed sensor element merely requires the connection of a light source and an electronic evaluation circuit to monitor the temperature of a plurality of battery cells. The sensor element and the spectrometer required for the selection can be embedded on the substrate 2 in the material of the housing 6. This offers a mechanically robust design which even survives rough operating conditions as can occur in vehicles without any damage. Furthermore, the employed materials can be produced in a cost-effective manner, thus enabling a use on the mass market without any problems.

Of course, the invention is not limited to the embodiments shown in the drawings. The above description should not be regarded as limiting but as explanatory. Features of different exemplary embodiments can be combined with one another. The below claims should be comprehended in such a way that a feature mentioned is present in at least one embodiment of the invention. This does not exclude the presence of further features. If the claims and the above description define "first" and "second" features, this designation serves for distinguishing two similar features without establishing an order.

The invention claimed is:

1. A planar-optical element comprising:
   a photonic component; and
   a substrate comprising at least one polymer, wherein the substrate includes at least one first film layer and a second film layer, the at least one first film layer having a first side and an opposite second side and the second film layer having a first side and an opposite second side, wherein the photonic component is arranged on the first side of the at least one first film layer, the first side of the second film layer is arranged on the second side of the at least one first film layer, and at least the second film layer comprising nanowires, at least in a subarea, arranged to reinforce the substrate.

2. The Planar-optical element according to claim 1, wherein the nanowires comprise zinc oxide and/or carbon nanotubes.

3. The Planar-optical element according to claim 1, wherein the nanowires have a diameter of about 100 nm to about 1000 nm.

4. The Planar-optical element according to claim 1, wherein the nanowires have a length of about 1 µm to about 10 µm.

5. The Planar-optical element according to claim 1, wherein the first film layer additionally comprises nanoparticles.

6. The Planar-optical element according to claim 5, wherein the nanoparticles comprises of $TiO_2$ and/or ZnO and/or $SiO_2$.

7. The Planar-optical element according to claim 1, wherein the photonic component in the first film layer is selected from at least one waveguide and/or at least one coupler and/or at least one arrayed waveguide grating and/or at least one fiber Bragg grating and/or at least one fiber-optic sensor.

8. The Planar-optical element according to claim 1, additionally comprising a third film layer having a first side and an opposite second side, wherein the third film layer comprises nanowires, at least in a subarea of the third film layer.

9. The Planar-optical element according to claim 1, wherein the nanowires have a presettable orientation.

10. A sensor element comprising at least one waveguide which includes at least one core made of a first material having a first refractive index ($n_1$) and a cladding which surrounds the at least one core and is made of a second material having a second refractive index ($n_2$), wherein at least one fiber Bragg grating is inserted in the core, wherein the sensor element is arranged on a substrate which comprises at least one polymer and the substrate has at least a first film layer having a first side and an opposite second side and a second film layer having a first side and an opposite second side, wherein the first side of the second film layer is arranged on the second side of the first film layer, the cladding is part of the first film layer and the core is inserted in the first film layer, wherein at least the second film layer comprises a means for reducing a coefficient of expansion of the second film layer, the means including nanowires arranged at least in a subarea of the second film layer.

11. The sensor element according to claim 10, wherein additionally at least one further waveguide and/or at least one coupler and/or at least one arrayed waveguide grating and/or at least one fiber Bragg grating is arranged in the first film layer.

12. The sensor element according to claim 10, wherein the nanowires comprise of zinc oxide and/or carbon nanotubes.

13. The sensor element according to claim 10, wherein the nanowires have a diameter of about 100 nm to about 1000 nm.

14. The sensor element according to claim 10, wherein the nanowires have a length of about 1 μm to about 10 μm.

15. The sensor element according to claim 10, wherein the first film layer additionally comprises nanoparticles.

16. The sensor element according to claim 15, wherein the nanoparticles comprise of $TiO_2$ and/or ZnO and/or $SiO_2$.

17. The sensor element according to claim 10, additionally comprising a third film layer having a first side and an opposite second side, wherein the third film layer comprises nanowires, at least in a subarea, wherein the first side of the third film layer is arranged on the second side of the second film layer.

18. The sensor element according to claim 10, wherein the nanowires have a presettable orientation.

19. The Planar-optical element according to claim 1, wherein the at least one first film layer includes nanoparticles but no nanowires.

* * * * *